United States Patent
Dunford

(12) 
(10) Patent No.: US 6,683,288 B1
(45) Date of Patent: Jan. 27, 2004

(54) HOT FOOD VENDING MACHINES

(75) Inventor: Bruce Dunford, Wimborne (GB)

(73) Assignee: Food Service Technology Limited, London (GB)

( * ) Notice: Subject to any disclaimer, the term of this patent is extended or adjusted under 35 U.S.C. 154(b) by 218 days.

(21) Appl. No.: 09/786,403

(22) PCT Filed: Jun. 26, 2000

(86) PCT No.: PCT/GB00/02487

§ 371 (c)(1), (2), (4) Date: Jun. 12, 2001

(87) PCT Pub. No.: WO01/16901

PCT Pub. Date: Mar. 8, 2001

(30) Foreign Application Priority Data

Jul. 1, 1999 (GB) ................................................ 9915335

(51) Int. Cl.[7] .................................................. H05B 6/80
(52) U.S. Cl. ..................... 219/679; 221/150 A; 221/121; 219/762
(58) Field of Search ................................ 219/679, 700, 219/701, 699, 739, 388; 34/259, 263, 264, 266, 92; 221/150 A, 121, 6, 76, 123, 150 HC, 133; 426/242, 466; 99/468, 472

(56) References Cited

U.S. PATENT DOCUMENTS

| 4,687,119 A | * | 8/1987 | Juillet ........................ 221/101 |
| 5,144,879 A | | 9/1992 | Alessi .......................... 99/327 |
| 5,210,387 A | * | 5/1993 | Smith et al. .......... 221/150 HC |
| 5,245,150 A | * | 9/1993 | Grandi ....................... 219/753 |
| 5,266,766 A | * | 11/1993 | Hecox ........................ 219/680 |
| 5,522,310 A | | 6/1996 | Black et al. .................. 99/357 |

FOREIGN PATENT DOCUMENTS

NL 8801951 3/1990

* cited by examiner

*Primary Examiner*—Quang T. Van
(74) *Attorney, Agent, or Firm*—Gifford, Krass, Groh, Sprinkle, Anderson & Citkowski, P.C.

(57) ABSTRACT

A system for removing a food container tray from a sleeve, placing the food tray in an oven of an automatic hot food vending machine, removing the hot food tray from the oven and replacing it in the tray, including means for preventing the sleeve from distorting while the food tray is in the oven.

16 Claims, 2 Drawing Sheets

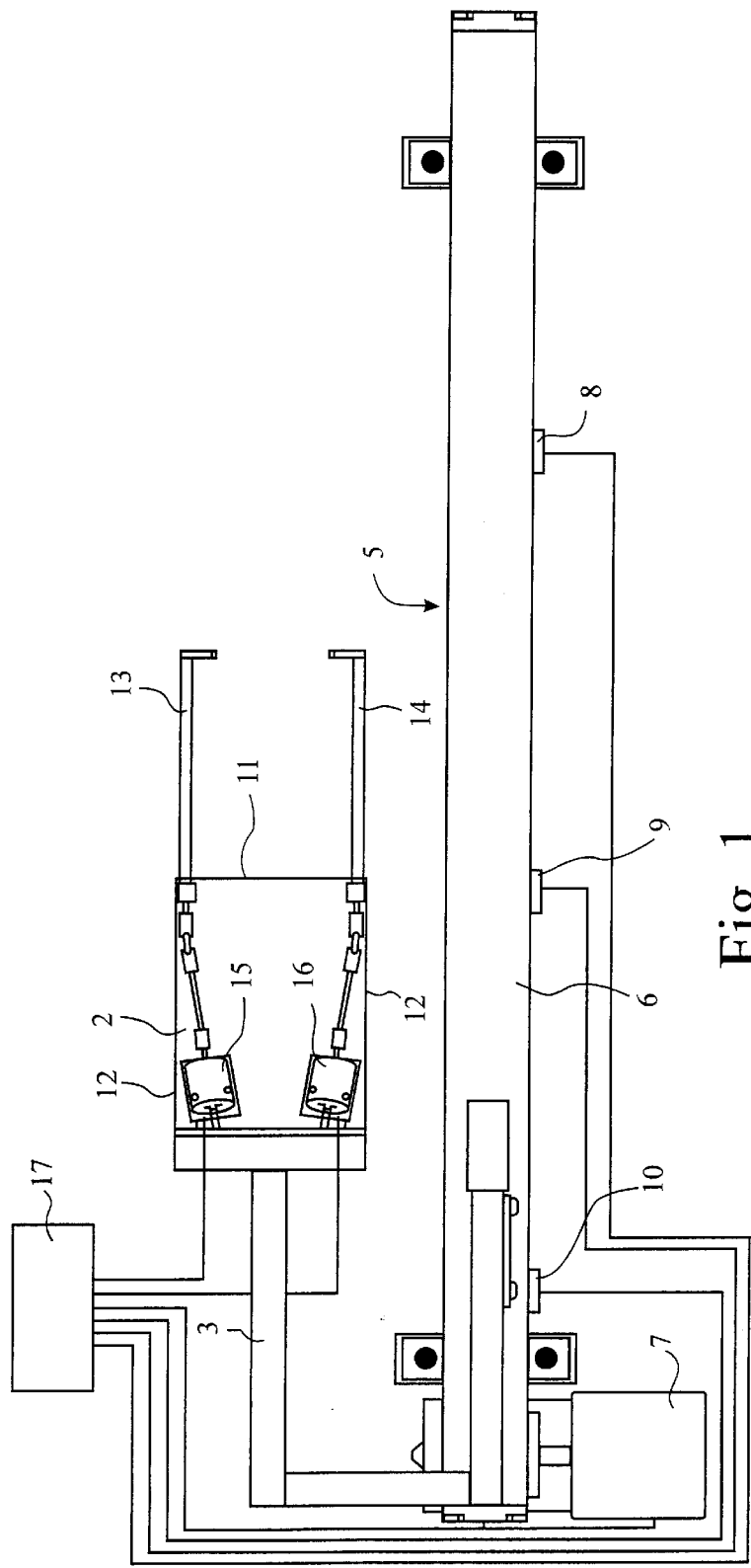
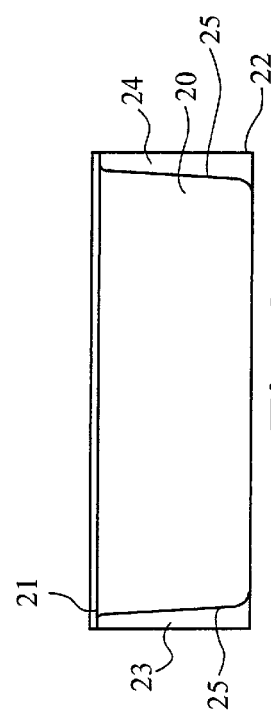

HOT FOOD VENDING MACHINES

The present invention relates to vending machines for supplying hot, cooked food. Vending machines for dispensing hot foods include a refrigerated storage compartment for uncooked, or at least partially cooked, food in individual containers, an oven, which for speed in heating usually is of the microwave type, means for retrieving containers of selected foods from the refrigerated storage compartment, placing them in the oven, removing them from the oven when cooked or reheated and dispensing the cooked or reheated meals, still in the containers. Usually, there is included also means for dispensing condiments appropriate to any selected meal. The present invention relates specifically to a mechanism for inserting the containers of food into the oven of a hot food vending machine, retrieving hot cooked food therefrom and presenting it for dispensation to a purchaser.

Specifications EP O 437 344, EP O 592 255 and U.S. Pat. No. 5,210,387 disclose hot food vending machines in which portions of food are held in plastic containers and sleeves which are stored in stacks in a refrigerated compartment from the top of which a selected container is removed vertically via a hole in a selector plate. The selected food container is placed on a conveyor and transported to a loading station at which the container is loaded into an oven by means of a ram which passes through the sleeve and is then withdrawn. After the food cooking cycle has been completed, the hot food container is withdrawn from the oven by a rake which also causes the food container to re-enter the sleeve before being conveyed to a dispensing station.

Not only is the arrangement described complicated mechanically in that the food withdrawal rake is mounted above the food loading ram and has to be moved in and out of its operative position at the appropriate moments of a food cooking cycle, but the cardboard sleeve can distort during the cooking phase so that the food container does not enter the sleeve readily after the removal of the food container from the oven, which can lead to an operational failure of the vending machine.

It is an object of the present invention to provide an improved food container handling system for use in a hot food vending machine.

According to the present invention there is provided a food container handling system for use in a hot food vending machine, comprising a ram adapted to pass through a sleeve enclosing a food container so as to remove the food container from the sleeve and load the food container into an oven forming part of the hot food vending machine and means for withdrawing the food container from the oven at the end of a cooking cycle and inserting the hot food container back into the sleeve, wherein there is included means for preventing distortion of the sleeve during the cooking cycle so as to facilitate the insertion of the hot food container into the sleeve at the end of the cooking cycle.

The means for preventing the distortion of the sleeve during the cooking cycle may be a front wall of the ram itself, the drive system of the ram being adapted to ensure that the said wall of the ram remains inside the sleeve during the cooking cycle. The ram may include vertical side walls. Alternatively, the sleeve may be held in a former during the oven loading, cooking an re-insertion phases of the vending operation.

In a preferred embodiment of the invention, the food container has a flange around its upper perimeter so as to leave two longitudinal passages between the sleeve and the side walls of the food container, and the means for withdrawing the food container from the oven and inserting it into the sleeve comprises two L-shaped arms which project from the leading edge of the ram and are adapted to pass initially through the said longitudinal passages between the sleeve and the hot food container as the ram moves forward to load the food container in the oven, is retracted to a waiting position and then moved forward to retrieve the hot food container from the oven, there being included means for rotating the arms to engage behind the hot food container and withdraw it from the oven and into the sleeve upon a further rearward motion of the ram.

An embodiment of the invention will now be described, by way of example, with reference to the accompanying drawings, in which:

FIG. 1 is a plan view of an embodiment of the invention,

FIG. 2 is a cross-section of a food container for use with the embodiment of the invention shown in FIG. 1.

Figure 3:
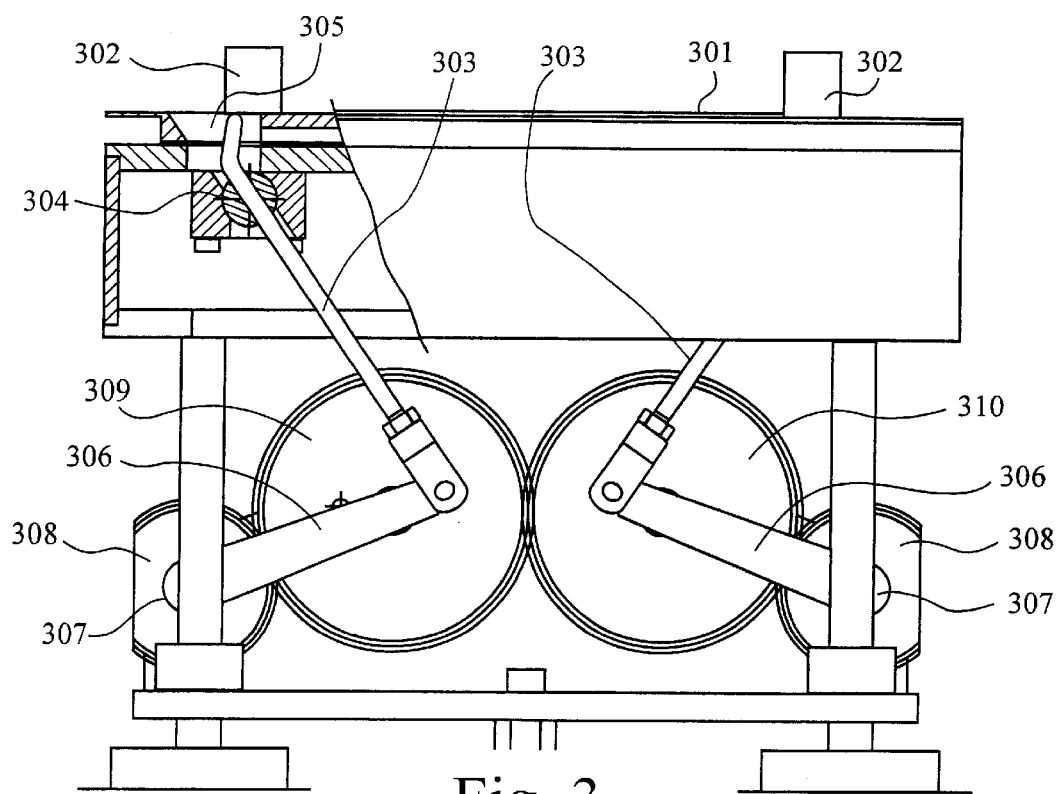
FIG. 3 shows a part sectional elevational view of a mechanism for correcting the shape and alignment of a food container and sleeve.

Referring to FIG. 1 of the drawings, a food handling system for use in an automatic hot food vending machine includes a food container transfer ram 1 which consists of a shovel 2 which is attached to a carriage 3 which forms part of a linear drive system 5. The linear drive system 5 includes a track 6, an electric motor 7 and three position sensors 8, 9 and 10. The shovel 2 has a front wall 11 and two side walls 12. Two L-shaped arms 13 and 14 project from the front wall 11 of the shovel 2 and are connected to respective rotary drive solenoids 15 and 16 unde the control of a central control unit 17 to which the position sensors 8, 9 and 10 are connected.

The motor 7 and position sensors 8, 9 and 10 could be replaced by a stepper motor or a motor with a suitable encoder.

Referring to FIG. 2 of the drawings, a food container 20 for use with the food handling system described above consists of a tray 20 made of a plastics material so that food placed in it can be heated or cooked by means of microwave radiation. The tray 20 has a flange 21 around its upper perimeter which is of a size such that the tray 20 is a free sliding fit in a rectangular section sleeve 22. The flange 21 on the tray 20 causes there to be two longitudinal passages 23, 24 between the side walls 25 of the tray 20 and the sleeve 22 when the tray 20 is in position within the sleeve 22.

The dimensions of the front and side walls 11, 12 of the shovel 2, the tray 20 and the sleeve 22 are chosen to be such that when the arms 13, 14 are position with their transverse portions parallel they will pass through the passages 23, 24 between the side walls 25 of the tray 20 and the sleeve 22, as well as the front and side walls 11 and 12 respectively, of the shovel 2, the latter being a free sliding fit in the sleeve 22.

After a customer has selected a desired meal from a menu displayed on the cabinet of an automatic hot food vending machine, the central control unit 17 causes a food container including that meal in a tray 20 within a sleeve 22 to be withdrawn from a refrigerated store and transported to a station in front of an oven to which both microwave radiation and hot air are supplied. None of this ancillary equipment is shown in the drawings. When the food container is in position in front of the oven door, the control unit 17 opens the oven door and causes the linear drive system 5 to move the shovel 2 towards the open oven door. Initially, the arms 13, 14 which have their transverse portions parallel to each other, pass through the passages 23, 24 between the sides 25 of the tray 20 and the sleeve 22. Further movement of the shovel 2 pushes the tray 20 out of the sleeve 22 and into the oven. The position sensor 8 senses when the linear drive system 5 has moved the shovel 2 to a position where this has been achieved, and sends an appropriate signal to the central control unit 17. The central control unit 17 then causes the shovel 2 to be retracted from the oven, closes the oven door and initiates a cooking period appropriate to the selected meal. The shovel 2 is retracted to a waiting position at which it is within the sleeve 22, so preventing the sleeve 22 from distorting during the cooking of the selected meal. The position sensor 9 is used to perform this operation. At the end of the cooking cycle, the central control unit 17 switches off the oven heating systems, opens the oven door and moves the shovel 2 forward again. The arms 13 pass along the sides of the tray 20 in the oven locating it positively. The movement of the shovel 2 is continued until the transverse portions of the arms 13 are behind the end of the tray 20. The central control unit 17 then causes the transverse portions of the arms 13, 14 to rotate inwardly to lock the tray 20 in position between the arms 13, 14. The central control unit 17 then causes the linear drive system 5 to move the shovel 2, and hence the tray 20, backwards drawing the tray 20 into the sleeve 22. This action being facilitated because the sleeve 22 has been prevented from distorting while the tray 20 was in the oven and because the arms 13 locate positively the tray 20 in relation to the sleeve 22. When the position of the shovel 2 is such that the tray 20 is completely within the sleeve 22, as determined by the position sensor 10, the central control unit 17 causes the arms 13 to be rotated to cause their transverse portions to be returned to a vertical position, so freeing the tray 20, and allowing the shovel 2 to be moved to a rest position with the arms 13 completely withdrawn from sleeve 22 so that the tray 20 and sleeve 22 can be moved by a further mechanism to a delivery port in the casing of the vending machine. Again, neither of these items is shown in the drawings.

It may so happen that during storage or transit to the oven feeding stage a food tray sleeve 22 and/or food tray 20 may become distorted or misaligned with respect to the food transfer ram 1 so that the front wall 11 of the food transfer ram 1 fails to enter the food tray sleeve 22.

FIG. 3 illustrates a mechanism which addresses this problem. Referring to FIG. 3, the oven feed station incorporates a table 301 upon the surface of which there are stops 302 so positioned as to engage with the food tray sleeve of a food package to prevent its movement by the motion of the food transfer ram 1.

At each side of the oven feed table 301 is a food tray enclosure member consisting of two hooked package locating arms 303 which operate in pivot and slide bearings 304 and slots 305. The package locating arms 303 are operated by actuating arms 306 to which they are pivotally attached. The activating arms 306 are attached to layshafts 307. The layshafts 307 are operated by gear wheels 308, that on the left side as shown in the figure being engaged with a directly driven gear wheel 309 and that on the other side being engaged with an idler gear 310. The gear wheel 309 is moved in an oscillatory fashion by an electric motor and control system, which are not shown in the drawing, such that the actuating arms 306 move through arcs of some sixty degrees, causing the ends of the package locating arms 303 initially to move outwards at approximately forty-five degrees to the plane of the oven feed table 301 to encompass a food tray 20 and surrounding sleeve 22 which has been delivered to the oven feed table 301 from a refrigerated store by a mechanism which is not shown in FIG. 3, but which is illustrated in our co-pending application GB 9915344.8. Further movement of the layshafts 307 causes the food package locating arms 303 to move inwards to a vertical position to re-shape the food tray 20 and sleeve 22 if they are distorted and then position the complete food package accurately in relation to the food transfer ram 1, which is not shown in the Figure. The reversal of the motion of the layshafts 307 after a cooked food package has been retrieved from the oven causes the food package locating arms 303 to retract to their original positions, so releasing the hot food package.

Figure 4:
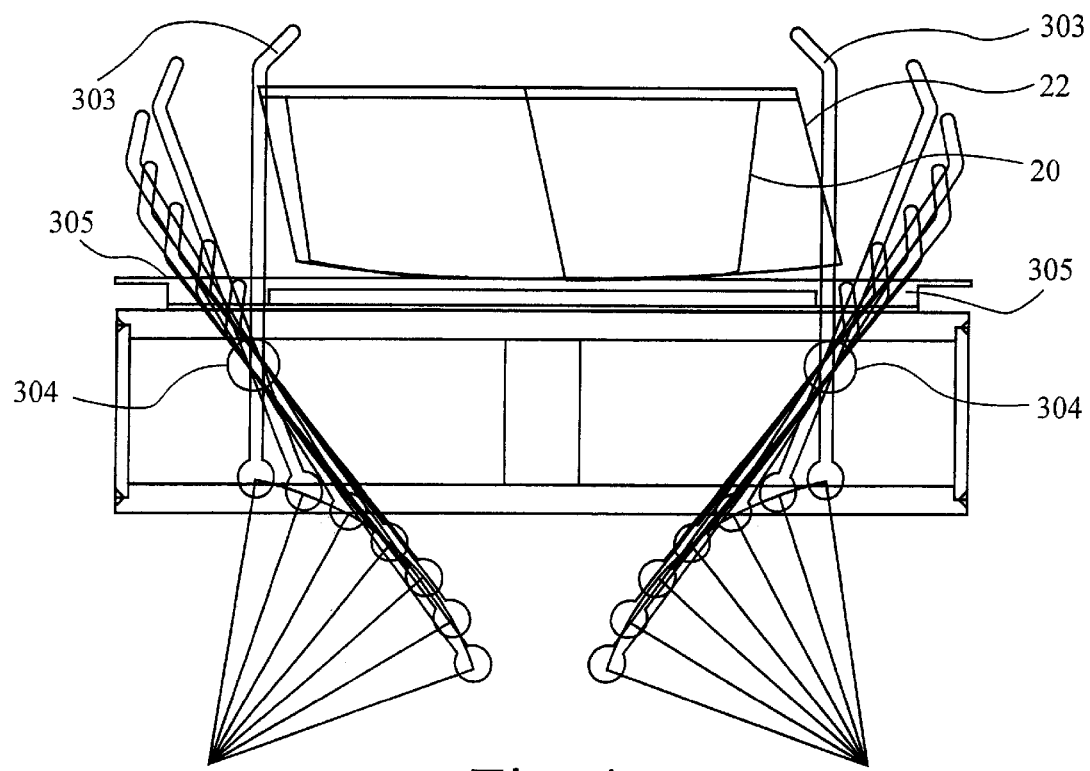
FIG. 4 illustrates the motion of a form of enclosure members incorporated in the mechanism of FIG. 3.

The sequence of movements of the package locating arms 303 is shown in FIG. 4. The dashed outline shows an initially distorted food tray 20 and sleeve 22 and the solid outline shows the correctly shaped food tray 20 and sleeve 22.

The package locating arms 303 also serve to maintain the shape of the sleeve during a cooking cycle.

What is claimed is:

1. A food container handling apparatus for an automatic hot food vending machine, said apparatus comprising:
    a ram adapted to pass through a sleeve enclosing a food container so as to remove the food container from said sleeve and load the food container into an oven of the hot food vending machine;
    a food container recovery means for withdrawing the food container from the oven at the end of a cooking cycle and inserting the food container back into the sleeve and,
    a sleeve support means for preventing distortion of the sleeve during the cooking cycle so as to facilitate insertion of the food container into the sleeve at the end of the cooking cycle, wherein said sleeve support means comprises at least one support member movable with the ram and adapted to be a free sliding fit in the sleeve.

2. Apparatus as claimed in claim 1 further comprising positioning means for positioning the ram during the cooking cycle with respect to the sleeve such that the support member is located within the sleeve, thereby to maintain the shape of the sleeve during the cooking cycle.

3. Apparatus as claimed in claim 1 wherein the recovery means comprises two parallel arms projecting from a leading edge of the ram, each arm having a longitudinally extending portion and a transverse portion, the transverse portions of the arms having a length dimension less than a corresponding internal dimension of the sleeve between opposing first and second sidewalls thereof such that when positioned parallel to each other the arms pass through respective first and second passages extending longitudinally between respective first and second side walls of the food container and the sleeve.

4. Apparatus as claimed in claim 3 wherein the longitudinally extending portions of the arms have a length dimension greater than a corresponding length dimension of the food container such that the transverse portions of the arms can be positioned beyond a remote end of the food container furthest from the ram when the food container is positioned in the oven.

5. Apparatus as claimed in claim 4 further comprising first actuator means for advancing the arms into the oven at the end of the cooking cycle, second actuator means for rotating the arms with respect to the ram such that the transverse portions latch behind the food container at the remote end thereof whereby said first actuator means moves the ram and the arms backward in a direction away from the oven to draw the food container into the sleeve means.

6. Apparatus as claimed in claim 5 further comprising position determining means for determining when the food container is re-inserted in the sleeve and control means responsive to said positioning means for controlling the second actuator means to rotate the arms to restore the transverse portions thereof to an initial parallel position and for controlling the first actuator means for moving the ram backwards to withdraw the arms from within the sleeve.

7. Apparatus as claimed in claim 6 wherein the ram and arms are mounted on a carriage of a linear drive system having a reversible electric motor and the position determining means comprises a plurality of position sensors disposed along the length of the linear drive system and adapted to determine the position of the ram along the length of the drive system when: a) the food container is in the oven; b) the ram is within the sleeve; c) the ram is in a position such that the food container tray is within the sleeve; or d) the ram is in a position where the arms are withdrawn from the sleeve.

8. Apparatus as claimed in claim 7 wherein the sensors produce position signals indicative of the ram position and the control means is responsive to the position signals to: move the ram from position d) to position a) with the transverse portions of the arms parallel; move the ram from position a) to position b), move the said ram from position b) to position a); rotate the arms inwardly until the transverse portions thereof are latched behind the food container tray at the remote end thereof; move the ram from position a) to position c), rotate the arms until the transverse portions thereof are parallel, move the ram from position c) to position d).

9. Apparatus as claimed in claim 7, wherein the electric motor is a stepper motor.

10. Apparatus as claimed in claim 5 wherein the second actuator means comprises at least one rotary solenoid.

11. Apparatus as claimed in claim 1 further comprising food container engagement means for engagement with the food container to correct distortions and/or misalignment of the sleeve relative to the ram so as to facilitate movement of the ram through the sleeve.

12. A food container handling apparatus for an automatic hot food vending machine, said apparatus comprising:

a food container engagement means for engagement with a food container to correct distortions and/or misalignment of a sleeve that encloses the food container relative to a ram so as to facilitate movement of said ram through the sleeve and wherein said engagement means comprises first and second food tray enclosure members adapted to move orthogonally of a longitudinal axis of the sleeve, and food tray enclosure member actuator means for moving the food tray enclosure members to a position outside an expected distortion envelope of the sleeve and moving the food tray enclosure members inwardly towards the envelope initially to enclose the sleeve and then to form it into a desired shape and locate it positively with respect to the ram.

13. Apparatus as claimed in claim 12 wherein the actuator means is adapted to cause the food tray enclosure members to hold the sleeve during a food cooking cycle following removal of the food container from the sleeve and then to retract to their respective initial positions when the food container has been re-inserted into the sleeve at the end of the cooking cycle.

14. Apparatus as claimed in claim 13 wherein the food tray enclosure members comprise a pair of opposed food tray capture arms mounted in respective first and second slide and rotate bearing means, and the food tray enclosure member actuator means is adapted to move the food tray capture arms through corresponding arcs such that their motion in a forward direction is upwardly initially and then inward with respect to the food container to hold the container and the reverse thereof to release the container.

15. Apparatus in claim 14 wherein the actuator means comprises a pair linked layshafts to which are attached respective actuating arms connected to the food tray capture arms and means for rotating the layshafts simultaneously through equal and opposite arcs so as to cause the food tray capture arms to move upwards initially and then inwards in the forward direction.

16. Apparatus as claimed in claim 12 wherein the engagement means also comprises support means for preventing distortion of the sleeve during a cooking cycle.

\* \* \* \* \*